Dec. 27, 1938.    A. SETZER    2,141,621
ELECTRIC STORAGE BATTERY
Filed Dec. 15, 1934    2 Sheets-Sheet 1

Inventor:
Albert Setzer
By
Attorneys.

Dec. 27, 1938.                A. SETZER                2,141,621
ELECTRIC STORAGE BATTERY
Filed Dec. 15, 1934.              2 Sheets-Sheet 2
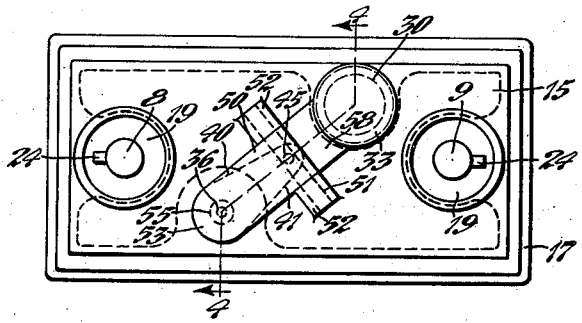
Fig. 3.
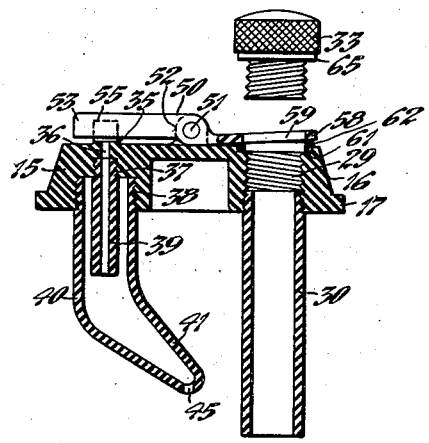
Fig. 5.
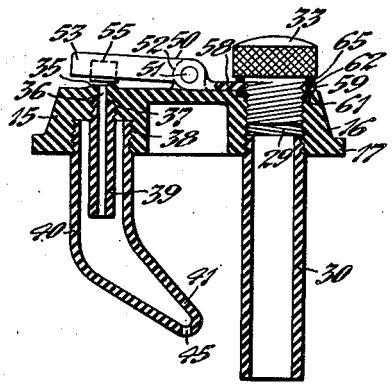
Fig. 4.
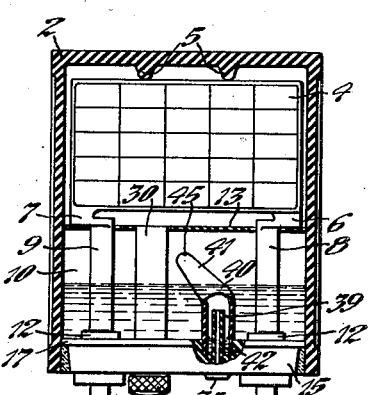
Fig. 7.
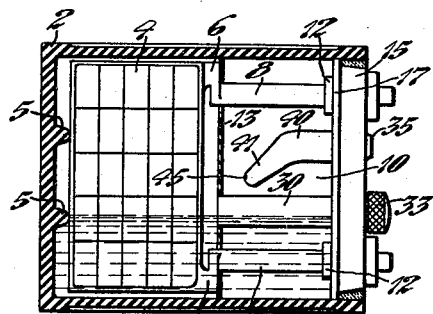
Fig. 6.
Fig. 8.
Inventor:
Albert Setzer
By
Attorneys.

Patented Dec. 27, 1938

2,141,621

UNITED STATES PATENT OFFICE 2,141,621

ELECTRIC STORAGE BATTERY

Albert Setzer, North Scituate, R. I.

Application December 15, 1934, Serial No. 757,668

1 Claim. (Cl. 136—177)

This invention relates to electric storage batteries and more particularly to an improved battery for airplanes, portable lanterns and other like uses wherein it is subjected to rocking, tilting or upturning.

One object of the invention is to provide a battery unit or cell having means to vent the gases generated during operation while preventing the escape of the liquid electrolyte therefrom when the battery is tipped or tilted from its normal upright position.

Another object of the invention is to provide a battery cell having a compartment located above the plates into which the liquid may flow when the battery is tilted and so constructed as to prevent its escape therefrom.

Another object of the invention is to provide means for preventing the introduction of an excessive amount of liquid into the cell during replenishment of the electrolyte.

Another object of the invention is to provide a battery cell having means for venting its interior which may be manually or automatically closed during replenishment of the electrolyte to prevent displacement of the air therefrom when the proper level has been attained, whereby to guard against raising the level of the liquid above the desired point.

Another object of the invention is to provide a battery cell having means for shielding and protecting the vent opening to prevent escape or leakage of the liquid from the cell when the battery is tilted from its normal upright position and additional means to prevent raising the liquid above the normal level at which the first means is effective.

Further objects of the improvement are set forth in the following specification which describes two preferred embodiments of the invention, by way of example, as illustrated by the accompanying drawings. In the drawings:

Fig. 3 is a plan view of the cell cover showing one form of automatic means for closing or sealing the vent opening;

Fig. 4 is a transverse sectional view through the cover, taken on line 4—4 of Fig. 3, showing the filler-plug in place and the vent opened to permit the escape of gas fumes from the cell;

Fig. 5 is a view similar to Fig. 4 showing the filler-plug removed to permit introduction of liquid into the cell and indicating the manner in which the vent is automatically sealed;

Fig. 6 is a longitudinal sectional view of the battery shown in reduced scale and illustrating the position of the liquid when the battery is tilted ninety degrees from its upright position;

Fig. 7 is a view similar to Fig. 6 showing the position assumed by the liquid when the battery is inverted from normal position; and Fig. 8 is a reduced transverse sectional view of the battery illustrating the position of the liquid when the battery is tilted ninety degrees from its upright position and at right-angles to the movement indicated in Fig. 6.

Figure 1:
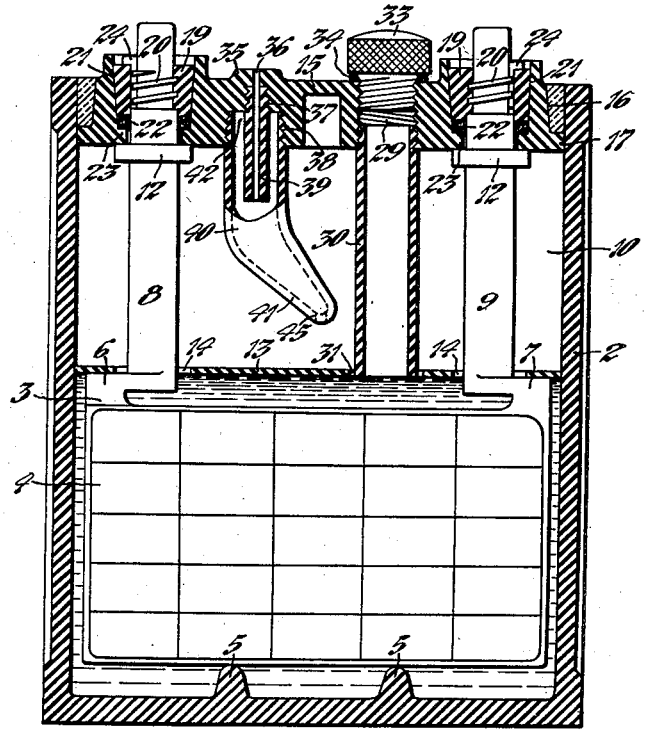
Fig. 1 is a vertical sectional view through a single cell electric storage battery constructed in accordance with the present invention.
Figure 2:
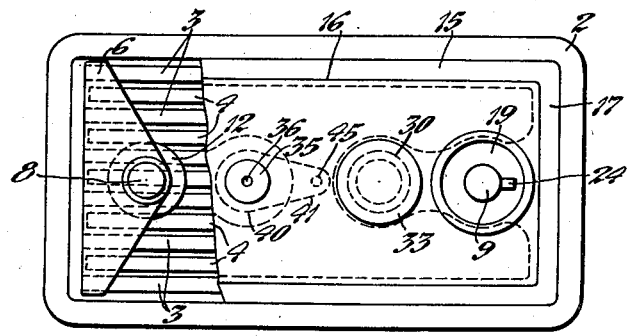
Fig. 2 is a plan view of the single cell battery with part of its cover shown as broken away to disclose the enclosed plates or electrodes.

Electric storage batteries employed in automobiles, boats, airplanes and for other similar uses are constantly subjected to tilting or rocking action which causes the liquid in the battery to be thrown against the cell cover and to escape through the vent opening usually provided therein. This is especially true with batteries used in airplanes which are subject to extreme angular movements and are sometimes flown upside down. When the liquid is permitted to escape from the cell over a period of time the supply immersing the plates or electrodes is substantially reduced, thereby resulting in buckling or other damage to the plates and a corresponding impairment in efficiency.

It is an aim of the present invention to eliminate this faulty condition by providing means to prevent leakage or escape of the liquid from the battery, whereby to guard against damage to the plates, insure greater electrical efficiency and prolong the life of the battery.

In general, the present improved battery comprises a casing or cell having an air space or compartment arranged above the plates or electrodes into which the liquid may flow when the battery is tilted from its normally vertical or upright position. The present invention also provides means for continuously venting the compartment to permit the escape of gases generated in the cell and means for shielding the vent opening to prevent leakage of the liquid therethrough when the battery is tilted. The invention also provides means for preventing the introduction of liquid into the cell above a normal level, this means operating to shut off the escape of air from the cell when the proper level has been reached.

Referring to the present drawings, the battery is herein illustrated as comprising a single cell but it is to be understood that it may be constructed with any number of cells or units to produce the required voltage. The battery cell preferably comprises a hard rubber case or jar 2 and the usual electrodes in the form of plates or grids 3 and 4 which rest upon laterally extending ribs 5 rising from the bottom of the jar. The upper ends of the plates 3 and 4 are united to the usual pillar-straps 6 and 7 in any suitable manner. Projecting upwardly from the straps 6 and 7 above the top of the case 2 are cylindrical binding-posts 8 and 9 for connection with the cables of the circuit in which the battery is to be used. The posts 8 and 9 are provided with flanges 12 arranged slightly below the top of the case 2 which serve as rests or supports for a hard rubber cover 15 fitted within the upper rim of the case.

A hard rubber baffle plate 13 extends across the interior of the case 2 resting upon the pillar-straps 6 and 7 with its edges fitted snugly against the walls of the case. The baffle plate 13 is provided with suitable holes 14 to adapt it to be passed over the flanges 12 on the posts 8 and 9 in assembling it with the case 2. It will be observed by reference to Fig. 1 of the drawings that a relatively large space or compartment 10 is provided between the top of the baffle plate 13 and the under side of the cover 15 for a purpose to be later explained.

The cover 15 is preferably constructed of molded rubber with relatively thin walls reinforced with vertical ribs to provide the required strength and stiffness. As herein illustrated the upper part of the cover 15 is recessed at 16 along its sides, thus forming a marginal flange 17 which abuts the interior walls of the case 2. In applying the cover 15 to the case 2 a melted cement or sealing compound is poured into the recess 16 and allowed to harden to seal the joint between the cover and the walls of the case. Before sealing, the cover is bound snugly against the flanges 12 on the posts 8 and 9 by means to be next described.

The means for binding the cover 15 against the flanges 12 is shown and described in my prior United States Letters Patent No. 1,505,219, dated August 19, 1924, and is therefore not herein described in detail. Suffice it to state that tapered nuts 19 are screwed onto the threaded upper portions 20 of the posts 8 and 9 to closely fit the sides of similarly-tapered circular recesses 21 formed in the top of the cover and extending co-axially with the posts 8 and 9. The nuts 19 engage and compress soft rubber gaskets 22 against inwardly directed flanges 23 at the bottom of the recesses 21 to provide a liquid-tight seal at these points and prevent leakage around the posts 8 and 9. Keys 24 driven into alined keyways in the threaded portions 20 of the posts 8 and 9 and the nuts 19 securely lock the nuts 19 in place to prevent loosening of the parts.

The cover 15 is provided with a threaded filling orifice 29 extending vertically therethrough and screwed into the lower end of the orifice is a filler-tube 30 which reaches downwardly with its lower end inserted through a hole 31 in the baffle plate 13. Screwed into the upper end of the threaded orifice 29 is a filler-plug 33 for closing the opening. It will be noted by reference to Fig. 1 that the filler-plug 33 is of the type generally employed in batteries except that it is imperforate or without the usual vent opening in its top. Disposed between the head of the filler-plug 33 and the top of the cover 15 is a soft rubber gasket 34 for preventing leakage of the liquid at this point.

In place of the usual vent hole formed in the filler plug, a small vent 36 is provided in the cover 15 of the cell in the embodiment of the invention as illustrated in Fig. 1. The vent hole 36 extends vertically through a raised boss 35 and on the under side of the boss are threaded counterbores 37 and 38 of different diameters. Screwed into the smaller or inner counterbore 37 is a tube 39 having an axial bore in register with the vent hole 36 in the cover 15. A tubular protecting shield 40 has its upper end screwed into the larger counterbore 38 in enclosing relation to the vent-tube 39 with its lower portion extending downwardly therebeyond into the compartment 10 of the battery cell. As shown in Fig. 1, the shield 40 is of horn shape having an offset portion 41 inclined to one side and tapered toward its lower end which is closed except for a restricted opening 45. The purpose in offsetting the portion 41 of the shield 40 is to position its end with the opening 45 at a point midway between the sides and ends of the case 2 slightly above the baffle plate 13.

The method of operation of the battery in the embodiment of the invention as above described is as follows:

With the parts assembled in the manner as above explained and illustrated in Fig. 1, the filler-plug 33 is removed from the opening 29 and the liquid electrolyte introduced into the cell through the filler-tube 30. Distilled water may be added to the electrolyte in the battery by pouring it through the tube 30 until the plates or grids 3 and 4 are entirely covered. During the filling operation the operator's finger is placed tightly over the vent-opening 36 in the cover 15 and as the liquid is poured into the cell an equal volume of air is exhausted therefrom through the tube 30 until the level of the liquid rises to cover the lower end of the tube. When displacement of the air through the tube 30 is arrested by the liquid surrounding the lower end of the tube, further introduction of water into the cell is prevented, it being the usual practice to continue pouring until it is observed that the liquid is rising in the tube 30. Through this method of supplying water to the battery-plates the compartment 10 remains empty with the liquid level below the vent opening 45 in the shield 40.

It will be observed by reference to Fig. 1 that the lower end of the filler-tube 30 is positioned a slight distance above the top of the plates or grids 3 and 4, thus insuring that sufficient liquid will have been introduced into the battery cell to entirely cover the plates before the escape of air through the tube is finally checked. When the battery has been supplied with the correct amount of liquid the vent opening 36 is uncovered and the small quantity of water in the tube 30 will descend into the cell, expelling an equal volume of air through the opening 36 by way of the shield 40 and vent-tube 39. The filler-plug 33 is then replaced and an electrical charge introduced into the battery to prepare it for service. The battery may thereafter be connected in circuit by attaching the terminal cables to the posts 8 and 9 in the usual manner.

It has been stated that batteries employed as equipment for vehicles, airplanes, portable lanterns and the like are subjected to tilting and rotative movement which causes the liquid to escape through the unprotected vent openings in the top of the battery cells. Should the liquid escape for any length of time the supply in the battery will be diminished to such an extent that the plates will be uncovered to cause subsequent warping or buckling thereof so as to impair the efficiency of the battery. Such leakage is also liable to cause damage to adjacent objects by the acid electrolyte.

To overcome this condition the present invention makes use of the compartment 10, into which the liquid may flow when the battery is tilted in any direction, and the shield 40 for protecting the vent-tube 39 to prevent escape or leakage of the fluid therethrough. Referring now to Figs. 6, 7 and 8, the battery is shown therein in several positions to which it may be tilted when used, for example, in an airplane. It will be observed that, regardless of the position assumed by the battery, the length of the shield 40 and the relation of the capacity of the casing to the volume of the liquid electrolyte is such that the level or surface of the liquid always remains below the opening 45 in the end of the protector-shield. The liquid is permitted to enter the compartment 10 through the holes or apertures 14 and 31 in the baffle plate 13 but its escape therefrom is prevented because of the location of the aperture 45 in the protecting shield 40 regardless of the angular position of the cell. If through splashing or otherwise, as when the cell is tilted to one of the positions shown in Figs. 6, 7 and 8, any of the liquid passes through the opening 45 it will drain down the inner sides of the shield 40 and into the well 42 formed between the vent-tube 39 and the enclosing wall of the shield without opportunity to escape through the tube. In this manner the liquid is prevented from escaping from the cell and as the battery is swung back to its normal position, as indicated in Fig. 1, the fluid will drain back into the cell through the opening 45. It will also be observed by reference to Figs. 6, 7 and 8 that at all times the interior of the cell will be vented to the atmosphere because of the position of the vent hole 45 with respect to the liquid level in the compartment 10.

During the use of the battery the electrolyte is reduced in volume due to evaporation and electrolysis and fresh water must be added to insure high efficiency. This may be easily accomplished in the manner before explained.

Figs. 3, 4 and 5 illustrate a modified form of construction embodying means for automatically sealing the vent opening 36 during the filling operation. The automatic vent-sealing means may comprise a lever 50 pivoted on a pin 51 held in a pair of bosses 52 formed integral with and projecting above the top of the cover 15. One arm 53 of the lever 50 extends horizontally above the cover 15 with its end provided with a soft rubber insert or plug 55 adapted to bear against the boss 35 on the top of the cover to close the vent-opening 36. The opposite arm 58 of the lever 50 overlies the filling hole 29 in the cover 15 into which the filler-plug 33 is screwed. This end of the arm 58 is apertured as at 59 to allow the threaded portion of the filler-plug 33 to pass therethrough when the plug is screwed into the filling hole 29. The cover 15 has a recess 61 surrounding the hole 29 to receive a soft rubber washer 62, the top of which projects above the top of the cover 15 to engage with the under side of the arm 58 of the lever 50. Held on the threaded portion of the filler-plug 33 abutting its head portion is a soft rubber washer 65 which cooperates with the washer 62, above described, to prevent leakage of the liquid around the plug.

In normal operation of the battery the filler-plug 33 is screwed down into place in the threaded filling hole 29 in the manner illustrated in Fig. 4, thereby forcing the arm 58 of the lever 50 downwardly to simultaneously raise the arm 53 to uncover the vent-opening 36 to permit escape of gas from the battery cell. When it becomes necessary to add water to the cell the filler-plug 33 is removed from the threaded opening 29 as shown in Fig. 5 and the water poured into the cell in the manner before explained. As the filler-plug 33 is withdrawn the resilient washer 62 acts to raise the arm 58 of the lever 50 and force the opposite arm 53 downwardly as shown in Fig. 5. The rubber plug 55 carried by the arm 52 is thereby pressed against the boss 35 to effectively and automatically close the vent-opening 36 to prevent escape of the air from the battery cell during the filling thereof for the purpose before explained.

It will be observed from the foregoing description and illustration that the present invention provides a battery that prevents leakage or spilling of the electrolyte, that prevents the introduction of an excessive amount of liquid into the cell, and of a simple construction that may be economically manufactured and easily assembled. It will also be observed that the novel features of construction particularly adapt the battery for use in airplanes, portable lanterns or the like where the battery is subjected to excessive rocking or tilting.

It will be apparent that the present invention has particular utility in airplanes in preventing the escape of acid electrolyte through the vent openings which would not only damage the materials adjacent the battery, but might be carried by the air stream of the propeller into engagement with the supporting members of the airplane structure such as struts, guy wires or the like and cause an active corrosion. In such event corrosive effect might not be noticed until after the member is so weakened as to cause a failure that may result in a serious accident. To this end the battery of the present invention provides an additional safety feature in an airplane because of its novel structure which insures free venting of the battery in all positions while preventing escape of the electrolyte.

It will also be apparent to one skilled in the art that the novel features illustrated and described may have a variety of mechanical expressions other than those shown and described in the two preferred embodiments and still be within the scope of the present invention. For instance, the parts may be of different sizes and shapes, the automatic sealing element may take a different form from the lever shown or the lever may be differently arranged and actuated by any resilient means such as a spring instead of the soft rubber washer shown. Therefore, without limiting myself in this respect, I claim:

In an electric storage battery cell, an enclosing casing, electrodes in the casing, an electrolyte immersing the electrodes, a vent opening in the top of the casing, a shield surrounding the vent opening to prevent the escape of electrolyte in any angular position of the casing, a filler opening in the top of the casing, a tube within the filler opening extending downwardly therefrom with its end positioned below the end of the shield, a lever pivotally mounted on the top of the casing with one arm overlying the vent opening to seal the latter and its opposite arm apertured to surround the filler opening, means normally urging the sealing arm into engagement with the vent opening while liquid is supplied to the cell, and a plug for the filler opening extending through the aperture in the arm of the lever and having a flange engaging the lever at the sides of the aperture to remove the sealing arm of the lever from the vent opening.

ALBERT SETZER.